(12) United States Patent
Kimura

(10) Patent No.: US 7,200,298 B2
(45) Date of Patent: Apr. 3, 2007

(54) OPTICAL CONTROL ELEMENT, OPTICAL CONTROL ELEMENT ARRAY, AND PROCESS FOR PRODUCING AN OPTICAL CONTROL ELEMENT

(75) Inventor: Koichi Kimura, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/941,051

(22) Filed: Sep. 15, 2004

(65) Prior Publication Data

US 2005/0111815 A1    May 26, 2005

(30) Foreign Application Priority Data

Sep. 16, 2003   (JP) .................. P. 2003-322987

(51) Int. Cl.
     *G02B 6/00*      (2006.01)
     *G02B 26/00*      (2006.01)
     *G02B 5/08*      (2006.01)

(52) U.S. Cl. .......................... 385/15; 385/18; 385/47; 359/291; 359/515

(58) Field of Classification Search ............ 385/2, 385/147
See application file for complete search history.

(56) References Cited

U.S. PATENT DOCUMENTS

| 5,459,610 A | 10/1995 | Bloom et al. |
| 2002/0048422 A1* | 4/2002 | Cotteverte et al. ............ 385/4 |
| 2004/0213534 A9* | 10/2004 | Matsuura et al. ........... 385/129 |

FOREIGN PATENT DOCUMENTS

| JP | 11-119122 A | 4/1999 |
| JP | 2000-121966 A | 4/2000 |
| JP | 2000-180737 A | 6/2000 |
| JP | 2000-180739 A | 6/2000 |
| JP | 2000-221678 A | 8/2002 |

* cited by examiner

*Primary Examiner*—Michelle Connelly-Cushwa
(74) *Attorney, Agent, or Firm*—Sughrue Mion, PLLC

(57) ABSTRACT

An optical control element for controlling an optical phenomenon by relatively changing levels of dots with respect to a film surface that is irradiated with light, wherein the optical control element includes a thin film having a plurality of through holes, a dot array in which a plurality of dots are protruded, the dots being loosely fitted into the through holes of the thin film, respectively, and a drive portion which relatively displaces at least one of the thin film and the dot array.

15 Claims, 10 Drawing Sheets

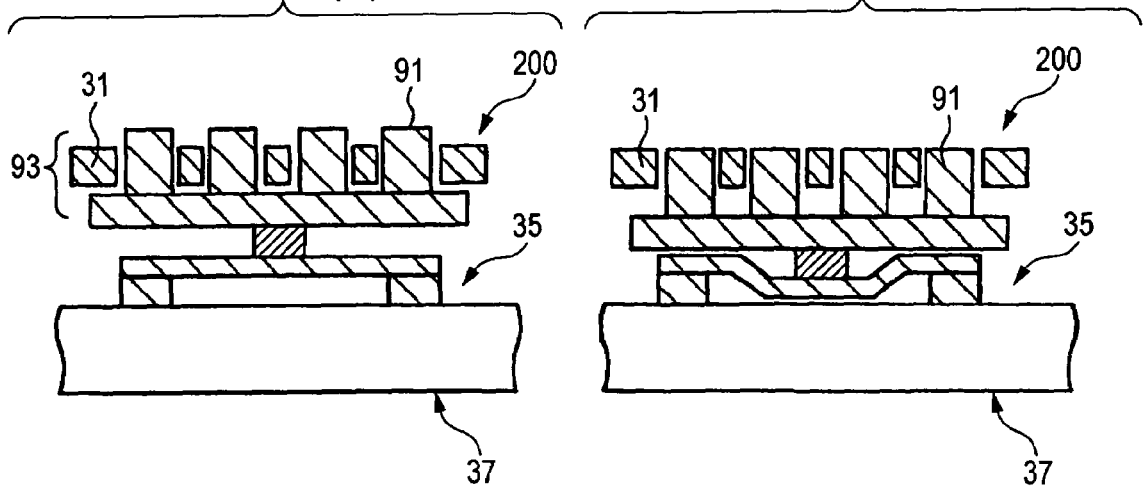
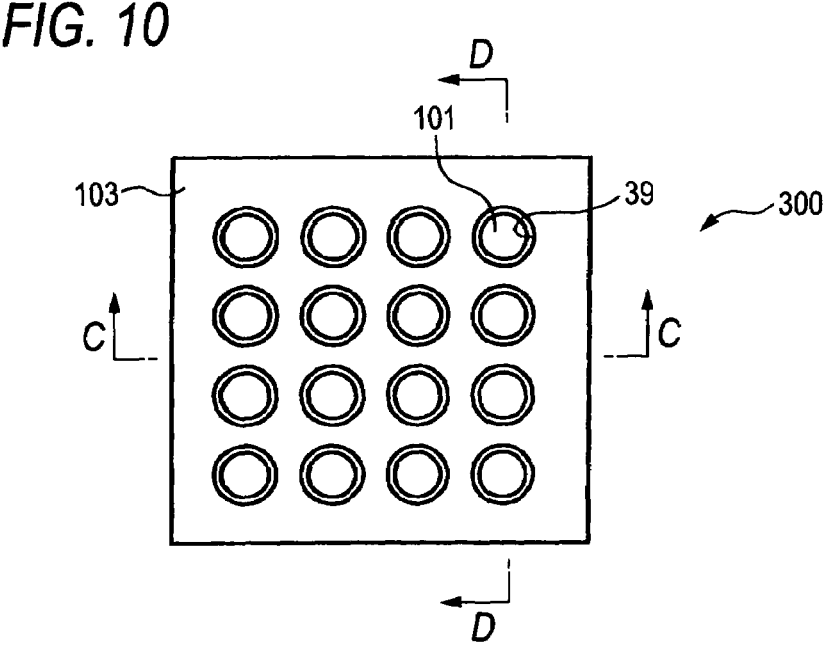
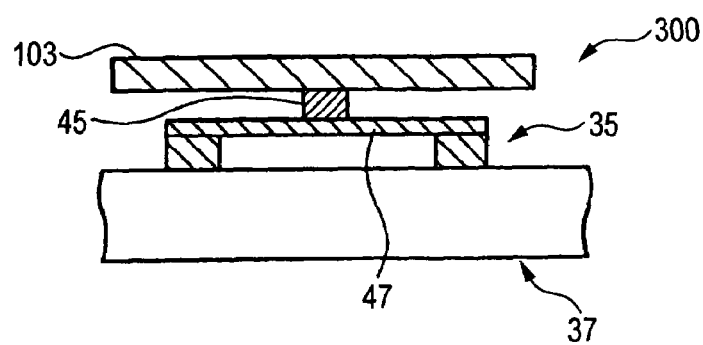

OPTICAL CONTROL ELEMENT, OPTICAL CONTROL ELEMENT ARRAY, AND PROCESS FOR PRODUCING AN OPTICAL CONTROL ELEMENT

This application is based on Japanese Patent application JP 2003-322987, filed Sep. 16, 2003, the entire content of which is hereby incorporated by reference.

BACKGROUND OF THE INVENTION

1. Technical Field of the Invention

The present invention relates to an optical control element and an optical control element array which are preferably useful in, for example, an on-demand digital exposure device that is used in a photolithography step, an image forming device due to digital exposure, a projection display device such as a projector, and a microdisplay device such as a head mounted display, and also to a method of producing such an optical control element. The invention relates also to a wavefront control element and a wavefront control element array for ultraviolet, visible, and infrared lights, and electromagnetic waves of longer wavelengths.

2. Description of the Related Art

As a micro-electro mechanical optical control element in which the MEMS (Micro-Electro Mechanical Systems) technique is used, for example, a GLV element (Grating Light Valve) using a diffraction grating, a DMD element (Digital Mirror Device) using minute deflecting mirrors, an optical control element based on Fabry-Perot interference, and an optical control element using total internal reflection (TIR) are known. Such optical control elements are practically used.

The MEMS technique is an element technique for electrically displacing or moving a micro structure on the order of micrometers. A typical production method for the MEMS technique is a microprocessing technique which is used in a semiconductor process technology.

Among the above optical control elements, for example, a GLV element is disclosed in U.S. Pat. No. 5,459,610. As shown in FIG. 22, the disclosed GLV 1 has a structure where plural (five or six) beams 5 respectively formed by thin films in which both ends are supported are arranged on an Si substrate 3 in a stripe pattern. A metal reflective film 7 made of Al or the like is disposed on the upper face of each of the beams 5. Below the beams 5, a common lower electrode 11 is formed on the substrate 3 via a gap 9. Usually, the beams 5 have a width of about 3 µm, and a pitch of about 5 µm.

When a voltage is applied between the lower electrode 11 and one of the metal reflective films 7 on the upper faces of the beams, an electrostatic force acts therebetween, and the corresponding beam 5 is flexed toward the substrate 3 to be vertically displaced. In the initial state, the beams 5 are at the same level, and the metal. reflective films on the upper faces operates as a usual total reflection mirror, so that incident light is regularly reflected. When a voltage is applied to alternate ones of the beams 5 to cause the applied beams 5 to be displaced, and the level difference between the beams and the not-displaced beams 5 is $\lambda/4$ ($\lambda$ is the wavelength of the light), the incident light is diffracted. Therefore, the incident light can be controlled to be regularly reflected or to be diffracted, depending on whether a voltage is applied or not applied.

In addition to the above-described optical control element, JP-A-11-119122, JP-A-2000-180737, JP-A-2000-180739, JP-A-2000-121966, and JP-A-2002-221678 relate to the present invention.

In all related optical control elements, one pixel (a minimum unit for controlling light) has only one displaceable structural member, or, as in a GLV element, several one-dimensional structural members (the beams 5 shown in FIG. 22).

In the field of optics, it is known that dot-like structural members which are two-dimensionally arranged exert various optical functions. When the shape and arrangement period of the dots are in the range from the order of $\lambda$ (wavelength) to about $20\lambda$, for example, light diffusion, light scattering, diffraction, interference, and the like occur. When they are shorter than the wavelength and in the level of $\lambda/2$, an optical phenomenon due to the photonic band effect occurs. When they are shorter than about $\lambda/10$, optical functions due to an index-controlled material based on the structural property, or the quantum optics effect are exerted. Namely, the structure of microdots or nanodots which are two-dimensionally arranged largely affects the optics. When the structure can be controlled by the MEMS technique, it is possible to realize various optical function elements.

In the related art, however, only several beams on the order of micrometers are displaced as in the GLV element described above, and there is no optical control element in which displacements of two-dimensionally arranged microdots or nanodots are controlled to exert an optical function.

Even if two-dimensionally arranged dots are individually controlled, a large number of drive portions for controlling displacements are required, and the area efficiency is poor. Therefore, this configuration cannot be practically used. Furthermore, when dots are independently formed and controlled, the shapes and properties of the dots are largely dispersed, and there arise the possibility that the quality and reliability of the dots are lowered.

SUMMARY OF THE INVENTION

The invention has been conducted in view of the above-described circumstances. It is a first object of the invention to provide an optical control element and an optical control element array in which displacements of two-dimensionally arranged microdots or nanodots can be controlled, and which can therefore exert various optical functions. It is a second object of the invention to provide a process for producing an optical control element by which a minute optical function portion configured by a thin film in which a plurality of through holes are opened, and dots that are loosely fitted into the through holes of the thin film, respectively can be formed without causing the shape and properties of the dots to be dispersed, and with attaining high reliability and quality.

The object can be attained by adoption of the following constitution, thereby achieving the invention.

More specifically, the invention is as follows:

(1). An optical control element in which an optical phenomenon is controlled by relatively changing levels of dots with respect to a film surface that is irradiated with light, wherein the optical control element comprises: a thin film in which a plurality of through holes are opened; a dot array in which a plurality of dots are protruded, the dots being loosely fitted into the through holes of the thin film, respectively; and a drive portion which relatively displaces one or both of the thin film and the dot array.

In the optical control element, the thin film, and the dot array in which the dots are loosely fitted into the through holes of the thin film constitute a minute optical function portion in which the thin film and the dots are relatively displaceable. Namely, displacements of two-dimensionally arranged microdots or nanodots can be controlled. According to the configuration, it is possible to exert various optical functions which are hardly exerted by a related structure where several beams are displaced in each pixel.

(2). The optical control element is characterized in that, in the optical control element of (1), the drive portion has a movable film, and the dot array is fixed to the movable film.

In the optical control element, the optical function portion configured by the thin film and the dot array, and the drive portion are functionally separated from each other. Therefore, restrictions between the portions are eliminated, so that the quality (such as the accuracy of the dot shape) of the optical function portion, the properties of the drive portion, and the like can be independently designed. A structure where the drive portion is placed under the optical function portion can be employed. Therefore, the drive portion can be hidden under the dot array, so that the effective area of the optical function portion is widened. In the structure where the drive portion is placed under the optical function portion, the dots can be vertically displaced with respect to the thin film, and hence the gaps between the through holes and the dots can be set small. Since the dot array driven by the drive portion is formed as an integral structure in which the dots are protruded, level uniformity among the dots can be easily ensured (the flatness of the optical function portion can be easily enhanced).

(3). The optical control element is characterized in that, in the optical control element of (1), each of the dots has a size of λ/10 to 10λ where λ is a wavelength of the light.

In the optical control element, the dot size is set to λ/10 to 10λ of the light wavelength λ. When the dot size is λ to 10λ, therefore, diffusion and diffraction are obtained. When the dot size is λ/2 to λ, diffraction and the photonic band effect are obtained, and, when the dot size is λ/20 to λ/2, various optical functions such as the quantum effect (quantum optics effect), absorption, and refractive-index control are obtained.

(4). The optical control element is characterized in that, in the optical control element of (1), the drive portion is an electrostatic microactuator which uses an electrostatic force as a driving force.

In the optical control element, the drive portion is configured by an electrostatic microactuator. The electrostatic microactuator is composed of, for example, a substrate, and a movable film which is supported with being separated from the substrate by a gap. When a voltage is applied, an electrostatic force acts on the movable film, and the movable film is displaced with respect to the substrate, thereby enabling fast response to be realized. Furthermore, low-voltage driving based on a CMOS circuit can be conducted, and the element can be easily produced. Therefore, integration and cost reduction are enabled.

(5). The optical control element array is characterized in that, in the optical control element of any one of (1) to (4), each of the optical control elements constitutes a pixel, and the optical control elements are arranged one- or two-dimensionally.

In the optical control element array, each of the optical control elements each having plural dots constitutes a pixel, and the optical control elements are arranged one- or two-dimensionally. Therefore, plural dots are displaced in each pixel, and the resolution of an image to be formed can be enhanced as compared with that in the related structure where one or several beams are displaced in each pixel. Moreover, various optical functions which are hardly realized in the related structure can be exerted. A high-speed exposure head element, and a high-resolution projector element in which such optical functions are used can be produced.

(6). The optical control element is characterized in that, in the optical control element of any one of (1) to (4), a multilayer mirror is formed at least on a surface of the thin film and upper faces of the dots.

In the optical control element, a multilayer mirror is formed on the surface of the thin film and the upper faces of the dots which are irradiated with light. Therefore, the reflectivity is made higher than that in the case of a metal reflective film, and the thin film absorbs a less amount of light, so that heat generation due to light absorption is reduced. As a result, the power resistance property of the optical function portion against a high-power laser can be enhanced.

(7). The optical control element is characterized in that, in the optical control element of any one of (1) to (4), when the drive portion does not conduct a driving operation, a surface of the thin film and upper faces of the dots are placed in a same plane, and, when the drive portion conducts a driving operation, the upper faces of the dots are placed lower in level than the surface of the thin film.

In the optical control element, normally, the surface of the thin film and the upper faces of the dots are placed in the same plane, and these faces of the optical function portion operate as a usual total reflection mirror, so that incident light is regularly reflected. By contrast, when the drive portion conducts a driving operation, the upper faces of the dots are placed lower in level than the surface of the thin film. When the level difference is equal to ¼ of the light wavelength λ, incident light is diffracted. Namely, an element which conducts regular reflection in a normal state, and which, when a voltage is applied, conducts diffraction is obtained.

(8). The optical control element is characterized in that, in the optical control element of any one of (1) to (4), when the drive portion does not conduct a driving operation, upper faces of the dots are placed higher in level than a surface of the thin film, and, when the drive portion conducts a driving operation, the surface of the thin film and the upper faces of the dots are placed in a same plane.

In the optical control element, normally, the faces of the dots are placed higher in level than the surface of the thin film. When the level difference is equal to ¼ of the light wavelength λ, incident light is diffracted. By contrast, when the drive portion conducts a driving operation, the dot array is lowered, and the dots are retracted into the through holes, so that the surface of the thin film and the upper faces of the dots are placed in the same plane. As a result, the optical function portion operates as a total reflection mirror, and incident light is regularly reflected. Namely, an element which conducts diffraction in a normal state, and which, when a voltage is applied, conducts regular reflection is obtained.

(9). The optical control element is characterized in that, in the optical control element of (1), the drive portion has a movable film, and the thin film is fixed to the movable film.

In the optical control element, the dot array is fixed, and the thin film in which the through holes are opened is fixed to the movable film of the drive portion. When the movable film is moved, the thin film is moved following the movement, with the result that the surface of the thin film is relatively moved with respect to the upper faces of the dots. In this case, the mass of the thin film functioning as a movable part is smaller than that of the dot array in which the large number of dots are formed. Therefore, this configuration is advantageous to speed enhancement. Moreover, it is not required to form the dot array and the drive portion with using a joining structure. Therefore, the structure of the element is simplified, and the element can be easily produced.

(10). The optical control element is characterized in that, in the optical control element of any one of (1) to (4), the dot array is divided into arrays of an arbitrary number of dots, and each of the divided dot arrays is driven by the drive portion.

In the optical control element, the dots which are two-dimensionally arranged are divided, for example, in the unit of row, column, or arbitrary combination of blocks. Each of the divided dot arrays is driven by the drive portion. The drive portion may be disposed in an arbitrary number. In the case where plural drive portions are disposed, the divided dot groups may be simultaneously driven, or independently driven. In this way, a pixel is configured by plural dots, and the plural dots are divided into groups of an arbitrary number of dots. When the divided dot groups are set, for example, so as to correspond respectively to RGB sub-pixels which are minimum pixels, therefore, colorization is enabled in the unit of pixel.

(11). The optical control element is characterized in that, in the optical control element of any one of (1) to (4), the through holes and the dots are arranged in a staggered pattern.

In the optical control element, the dots of the dot array are loosely fitted into the through holes which are opened in the thin film, respectively. When the dots and the through holes have a circular or hexagonal shape in a plan view and are arranged in a staggered pattern, for example, the distance between the dots can be shortened, and hence the arrangement density is made higher.

(12). The optical control element is characterized in that, in the optical control element of any one of (1) to (4), a light absorbing layer made of an absorbing material for the light is formed on a side face of each of the dots.

In the optical control element, when the surface of the thin film and the upper faces of the dots are placed in the same plane, light incident on the optical function portion is regularly reflected. On the contrary, in the state where the dots are protruded from the surface of the thin film, the side faces of the dots on which the light absorbing layer is formed are exposed. When an optical path is designed so that light is incident on these portions, therefore, it is possible to control regular reflection and absorption of light.

(13). A process for producing an optical control element comprises: a thin film in which a plurality of through holes are opened; a dot array in which a plurality of dots are protruded, the dots being loosely fitted into the through holes of the thin film, respectively; and a drive portion which displaces the dot array with respect to the thin film, wherein the process includes the steps of: forming a sacrifice layer on an upper face of a base portion of the dot array in which a lower face is coupled to the drive portion, and forming a plurality of dot holes through which the upper face of the base portion is exposed, in the sacrifice layer; forming a thin film layer on the sacrifice layer; and removing the thin film layer along outer peripheries of the dot holes, to a depth at which removed portions reach the sacrifice layer, and removing the sacrifice layer, thereby forming dots which are separated from the thin film layer, on the upper face of the base portion.

In the process for producing an optical control element, the sacrifice layer is formed on the upper face of the base portion of the dot array, and dot holes through which the upper face of the base portion is exposed are formed in the sacrifice layer. Then, the thin film layer is deposited on the sacrifice layer. The thin film is removed away along outer peripheries of the dot holes, to a depth at which the removed portions reach a positive photoresist layer, and the sacrifice layer is then removed away. Therefore, the thin film layer which enters the dot holes to cover the positive photoresist layer is separated into dots that are bonded to the upper face of the base portion and upstand therefrom, and the thin film in which the dots are loosely fitted into the through holes. As a result, it is possible to form a minute optical function portion configured by the thin film in which the plural through holes are opened, and the dots that are loosely fitted into the through holes of the thin film, respectively.

(14). The process for producing an optical control element is characterized in that, in the production process of (13), in the step of removing the sacrifice layer, openings through which the sacrifice layer is exposed are formed in the thin film layer other than regions extending along the outer peripheries of the dot holes.

In the process for producing an optical control element, the openings through which the sacrifice layer is exposed are formed in the thin film layer. Therefore, the exposed portions of the sacrifice layer, which are originally restricted to the removed portions (cylindrical gaps) of the thin film layer that are removed to a depth at which they reach the sacrifice layer and along the outer peripheries of the dot holes, can be increased by the openings. As a result, the sacrifice layer can be rapidly etched.

The optical control element of the present invention comprises: a thin film in which a plurality of through holes are opened; a dot array in which a plurality of dots are protruded, the dots being loosely fitted into the through holes of the thin film, respectively; and a drive portion which relatively displaces one or both of the thin film and the dot array. Therefore, a minute optical function portion can be displaceably formed, and displacements of two-dimensionally arranged microdots or nanodots can be controlled. Consequently, it is possible to exert various optical functions which are hardly exerted by a related structure where several beams are displaced in each pixel.

The optical control element array of the invention is an optical control element array which uses optical control elements according to any one of (1) to (4), and in which each of the optical control elements constitutes a pixel, and the optical control elements are arranged one- or two-dimensionally. Therefore, plural dots are displaced in each pixel, so that the resolution of an image to be formed can be enhanced as compared with that in the related structure where one or several beams are displaced in each pixel. Moreover, it is possible to produce a high-speed exposure head element, and a high-resolution projector element that exert various optical functions which are hardly realized in the related structure.

In the process for producing an optical control element of the present invention, a plurality of dot holes through which an upper face of a base portion of a dot array is exposed are formed in a positive photoresist layer formed on the upper face of the base portion, a thin film layer is depositedon the positive photoresist layer, the thin film layer is removed away along outer peripheries of the dot holes, to a depth at which removed portions reach the positive photoresist layer, and then the positive photoresist layer is removed away. Therefore, the thin film layer which enters the dot holes to cover the positive photoresist layer is separated into dots that are bonded to the upper face of the base portion and upstand therefrom, and the thin film in which the dots are loosely fitted into the through holes. As a result, it is possible to form a minute optical function portion configured by the thin film in which the plural through holes are opened, and the dots that are loosely fitted into the through holes of the thin film, respectively, without causing the shape and properties of the dots to be dispersed, and with attaining high reliability and quality.

BRIEF DESCRIPTION OF THE DRAWINGS

FIG. 9 is a section view of a second embodiment in which dots are protruded from a thin film in the initial state.

FIG. 10 is a plan view of a third embodiment in which a thin film is movable and dots are stationary.

FIG. 11 is a section view taken along the line C—C in FIG. 10.

DETAILED DESCRIPTION OF THE INVENTION

Hereinafter, preferred embodiments of the optical control element, the optical control element array, and the process for producing an optical control element according to the invention will be described in detail with reference to the drawings attached hereto.

Figure 1:
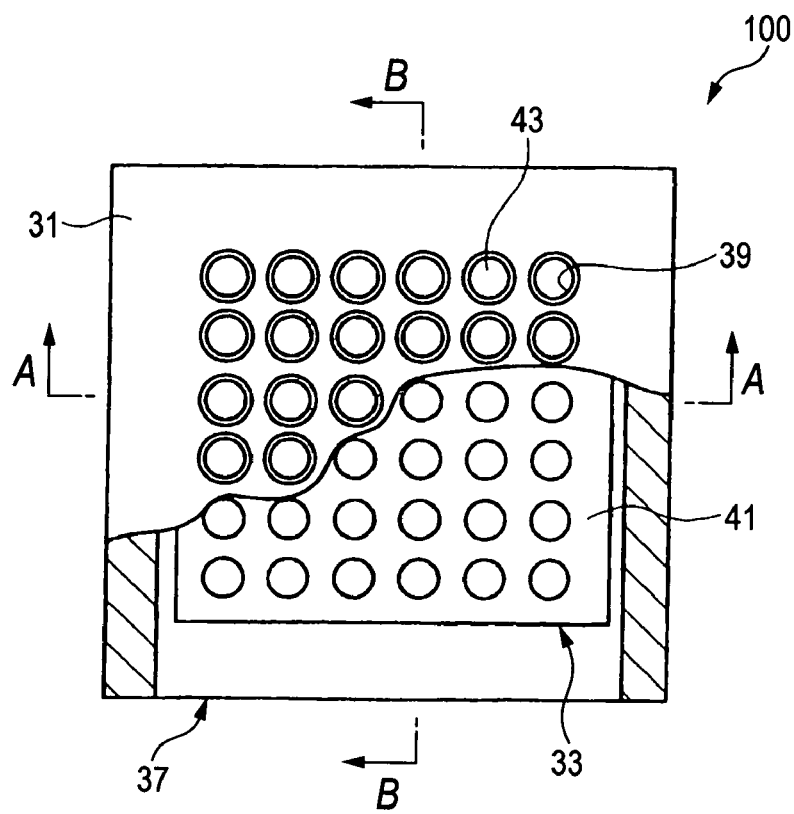
FIG. 1 is a partially fragmentary plan view illustrating a first embodiment of the optical control element of the invention.
Figure 2:
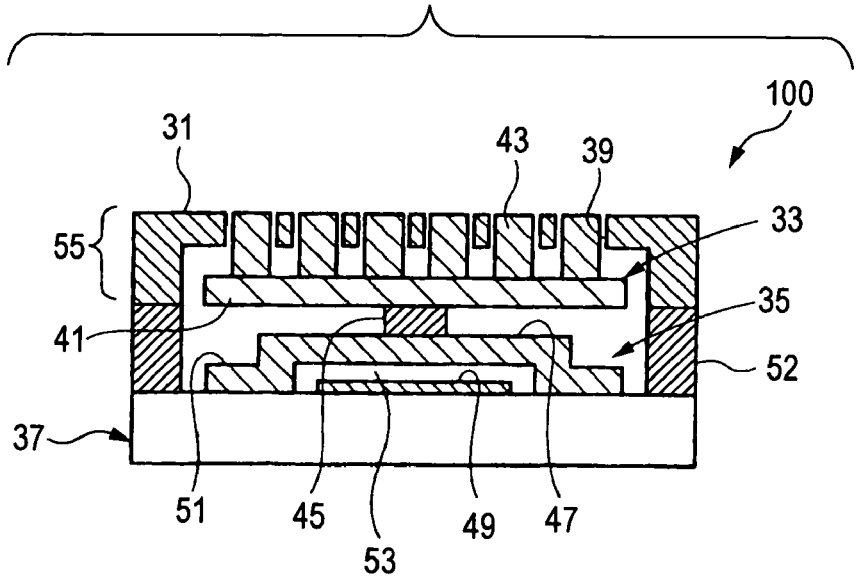
FIG. 2 is a section view taken along the line A—A in FIG. 1.
Figure 3:
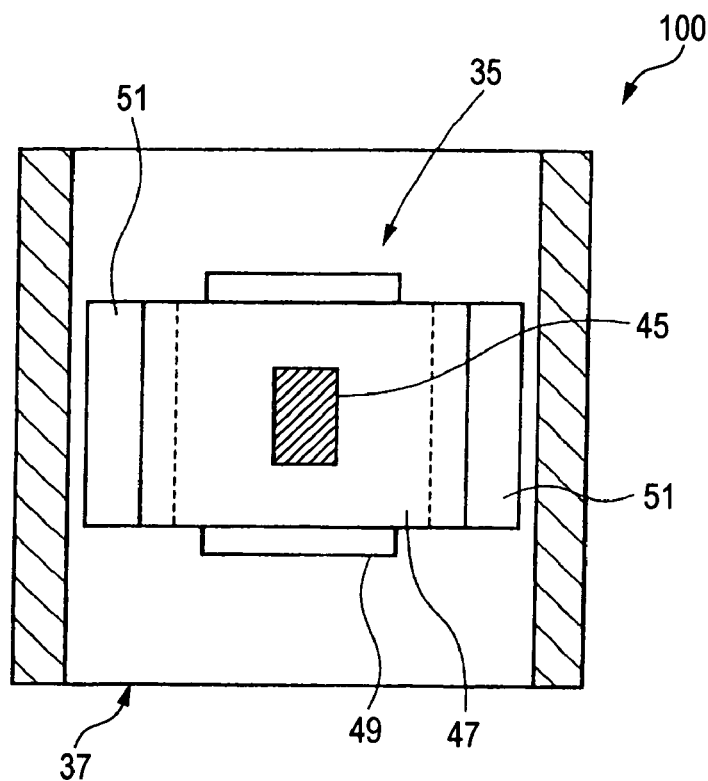
FIG. 3 is a plan view of a drive portion.
Figure 4:
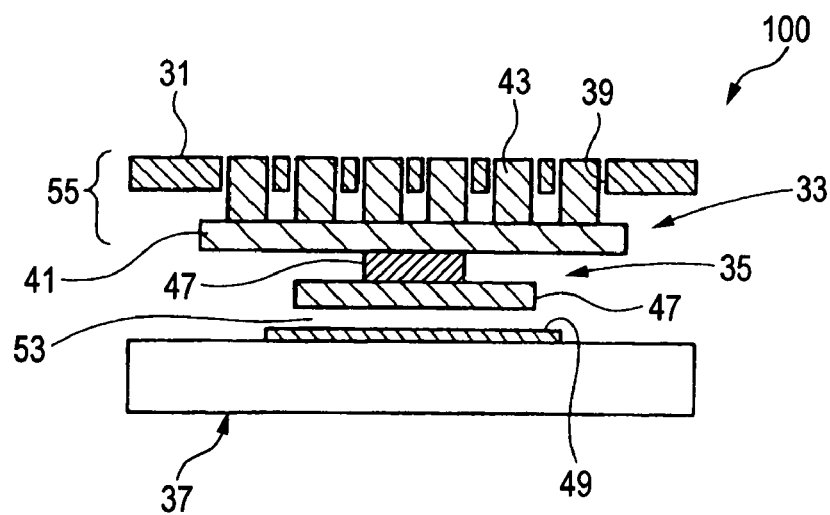
FIG. 4 is a section view taken along the line B—B in FIG. 1.
Figure 5:
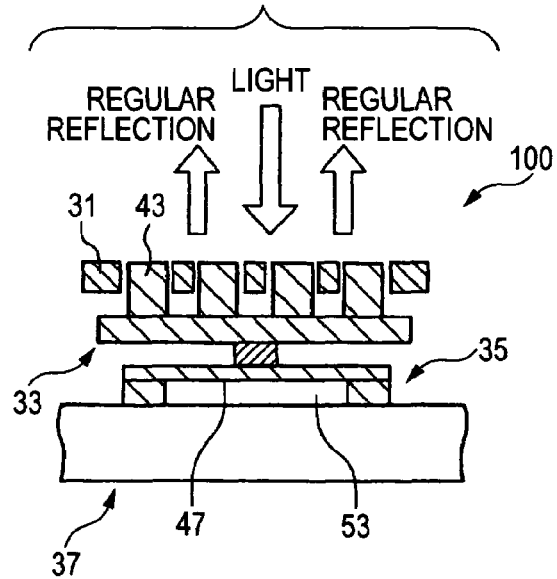
FIG. 5A is a diagram illustrating the operation of the optical control element shown in FIG. 1 in an initial state.
FIG. 5B is a diagram illustrating the operation of the optical control element in a driven state.
Figure 5:
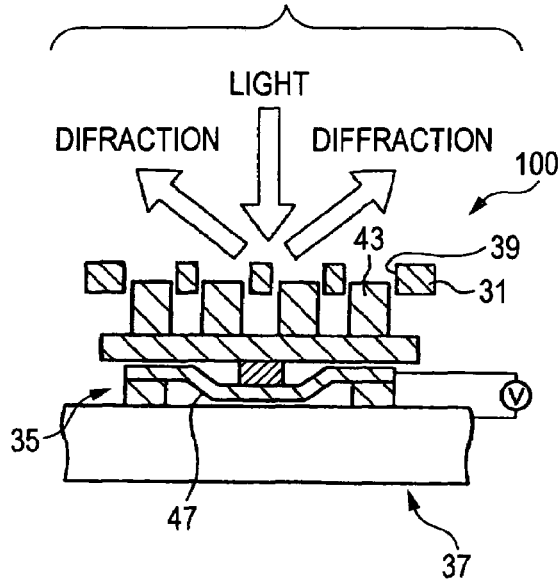

FIG. 1 is a partially fragmentary plan view illustrating a first embodiment of the optical control element of the invention, FIG. 2 is a section view taken along the line A—A in FIG. 1, FIG. 3 is a plan view of a drive portion, FIG. 4 is a section view taken along the line B—B in FIG. 1, FIG. 5A is a diagram illustrating the operation of the optical control element shown in FIG. 1 in an initial state, and FIG. 5B is a diagram illustrating the operation of the optical control element in a driven state.

An optical control element 100 has a thin film (stationary surface film) 31, a dot array 33, a drive portion 35, and a substrate 37 as principal components. The stationary surface film 31 functions as a reflective film of the optical control element 100, and is formed by a metal thin film such as an aluminum thin film. In order to enhance the reflectivity, the stationary surface film 31 may be covered with a dielectric multilayer film which is not shown. In the stationary surface film 31, a plurality of circular through holes 39 are opened in a single-pixel region having, for example, a rectangular shape. In the embodiment, six columns each configured by six through holes 39 are arranged so that a total of 36 through holes 39 are disposed. Namely, the through holes 39 are two-dimensionally arranged.

The dot array 33 is placed below the stationary surface film 31, and has a base portion (support film) 41 parallel to the stationary surface film 31. The base portion 41 is formed by an aluminum thin film or the like which is separated by a gap from the stationary surface film 31. A plurality of dots 43 are protruded from the upper face of the base portion 41 at positions corresponding to the through holes 39. The tip end portions of the dots 43 are loosely fitted into the through holes 39, respectively. Namely, each of the dots 43 is axially movable in the through holes 39 corresponding to the dots 43. In the normal state (the state where the drive portion 35 does not drive the dot array 33), the upper faces of the dots 43 are placed on the same surface as the surface of the stationary surface film 31.

The drive portion 35 is placed below the dot array 33, and fixed to the base portion 41 of the dot array 33 via a connecting portion 45. The drive portion 35 has a movable film 47 which is fixed to the base portion 41, and a lower electrode 49. The movable film 47 is elastic, and formed into a rectangular shape. Both ends in the longitudinal direction of the movable film are supported by the substrate 37 via supporting portions 51. The movable film 47 is opposed in parallel to the substrate 37 with being separated by a gap 53 which is formed by a sacrifice layer.

As described above, the optical control element 100 is structured so that an optical function portion 55 configured by the stationary surface film 31 and the dot array 33, and the drive portion 35 are coupled to each other by the connecting portion 45. In this embodiment, the optical function portion 55 are connected to the drive portion 35 through a connecting portion 45. Alternatively, the drive portion 35 and the optical function portion 55 may be connected directly.

Each of the dots 43 in the optical function portion 55 is set to have a size which is $\lambda/10$ to $10\lambda$ where $\lambda$ is the wavelength of light incident on the stationary surface film 31.

Because of the dot size, various optical functions can be obtained in the following manner. When the dot size is λ to 10λ with respect to the light wavelength λ, optical functions of diffusion and diffraction are obtained. When the dot size is λ/2 to λ, diffraction and the photonic band effect are obtained, and, when the dot size is λ/20 to λ/2, various optical functions such as the quantum effect (quantum optics effect), absorption, and refractive-index control are obtained. In the following description of the embodiment, the case where diffraction is obtained as an optical function will be described.

The lower electrode 49 shown in FIG. 2 is opposed to the movable film 47 via the gap 53. A movable electrode which is not shown is disposed on the movable film 47, or alternatively the movable film 47 is formed by a metal film so that the movable film itself functions as an electrode. Namely, the drive portion 35 is formed as an electrostatic microactuator which uses an electrostatic force as a driving force. In the drive portion 35 of the electrostatic microactuator type, when a voltage is applied between the lower electrode 49 and the movable electrode, an electrostatic force acts on the movable film 47, and the movable film 47 is displaced with respect to the substrate 37, thereby enabling fast response to be realized.

Specifically, when a voltage V is applied between the lower electrode 49 and the movable electrode, charges are electrostatically induced in the movable film 47. The movable film 47 is attracted toward the substrate 37 to be elastically deformed, by an electrostatic force which acts between the charges and the lower electrode 49 of the substrate 37. By contrast, when the application of the voltage V is cancelled and the attractive force due to the electrostatic force is lost, a center portion of the movable film 47 is separated from the substrate 37 by an elastic self-restoring force, and the movable film is again placed in the position separated therefrom by the gap 53.

In the optical control element 100, the driving of the movable film 47 by the drive portion 35 causes the dot array 33 to be moved in the approaching/separating direction (the vertical direction in FIG. 2) to the stationary surface film 31, with the result that the dots 43 are moved in the axial direction with respect to the through holes 39. When the drive portion 35 does not conduct the driving operation, the surface of the stationary surface film 31 and the upper faces of the dots 43 are placed in the same plane, and, when the drive portion 35 conducts the driving operation, the upper faces of the dots 43 are placed lower in level than the surface of the stationary surface film 31.

In the normal state, therefore, the surface of the stationary surface film 31 and the upper faces of the dots 43 are placed in the same plane, and these faces of the optical function portion 55 operate as a usual total reflection mirror, so that incident light is regularly reflected. By contrast, when the drive portion 35 conducts the driving operation, the upper faces of the dots 43 are placed lower in level than the surface of the stationary surface film 3, so that incident light is diffracted. Namely, an element which conducts regular reflection in the normal state, and which, when a voltage is applied, conducts diffraction is obtained.

In the drive portion 35 of the electrostatic microactuator type, low-voltage driving based on a CMOS circuit can be conducted, and the optical control element 100 can be easily produced. Therefore, integration and cost reduction are enabled.

In the embodiment described above, the drive portion 35 is a parallel plate type electrostatic microactuator. Alternatively, the drive portion 35 may be a vertical comb drive electrostatic micro actuator (comb-drive), a piezoelectric actuator, or an electromagnetic actuator.

Next, the operation of the thus configured optical control element 100 will be described.

In the optical control element 100, in the normal state (the state where the drive portion 35 does not conduct the driving operation), the movable film 47 is placed in the position which is separated from the substrate 37 by the gap 53, and, as shown in FIG. 5A, the upper faces of the dots 43 of the dot array 33 disposed in the upper side are placed in the same plane as the surface of the stationary surface film 31. When the stationary surface film 31 is irradiated with light in this state, the incident light is regularly reflected by the surface of the stationary surface film 31 and the upper faces of the dots 43 which ate in the same plane to constitute a reflective face.

By contrast, when the voltage V is applied between the lower electrode 49 and the movable electrode, the movable film 47 is attracted by the above-described function toward the substrate 37 to be elastically deformed, and, as shown in FIG. 5B, the dots 43 are retracted into the through holes 39, so that the upper faces of the dots 43 are placed lower in level than the stationary surface film 31. When the stationary surface film 31 is irradiated with light in this state, the reflected light is diffused or diffracted.

When the application of the voltage V between the lower electrode 49 and the movable electrode is cancelled, the movable film 47 is elastically restored to the position which is separated from the substrate 37 by the gap 53, and the dot array 33 is upward moved. As a result, the upper faces of the dots 43 and the surface of the stationary surface film 31 are placed in the same plane, so as to again cause the incident light to be regularly reflected.

Next, a process for producing the optical control element will be described.

Figure 6:
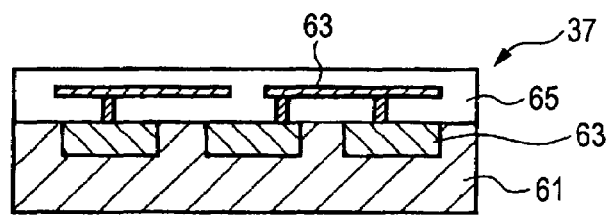
FIG. 6 is a section view of a driving circuit substrate of the optical control element of the first embodiment.
Figure 7:
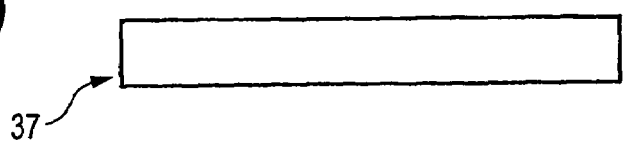
FIG. 7 is a diagram showing steps (a) to (g) of producing the optical control element of the first embodiment.
Figure 7:
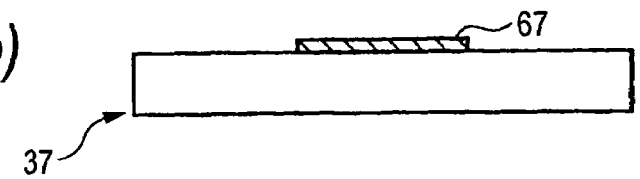
Figure 7:
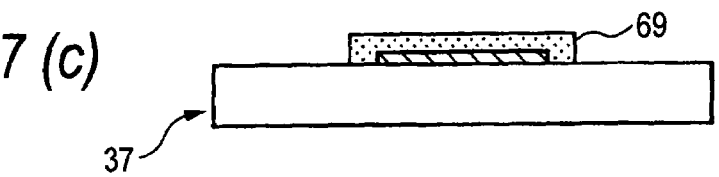
Figure 7:
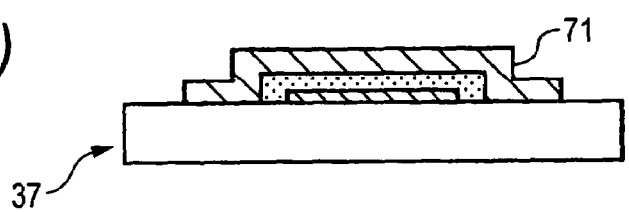
Figure 7:
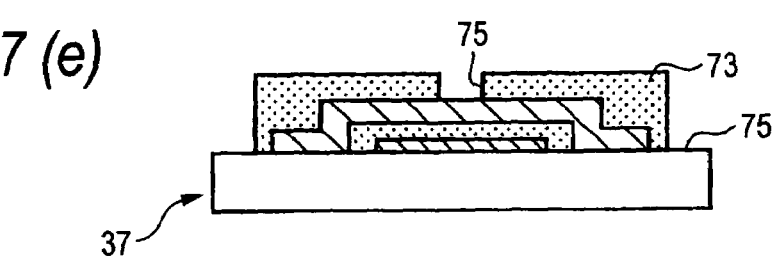
Figure 7:
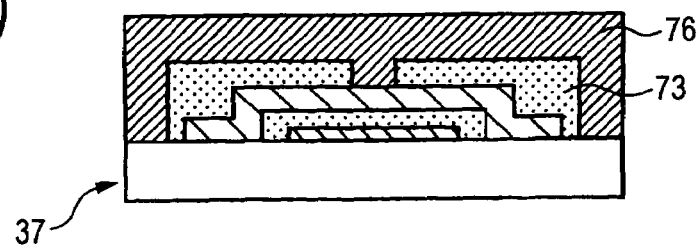
Figure 7:
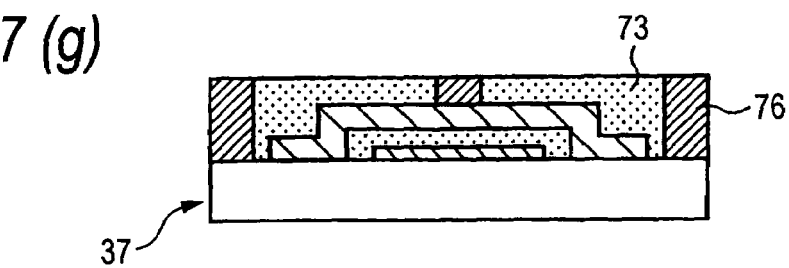
Figure 8:
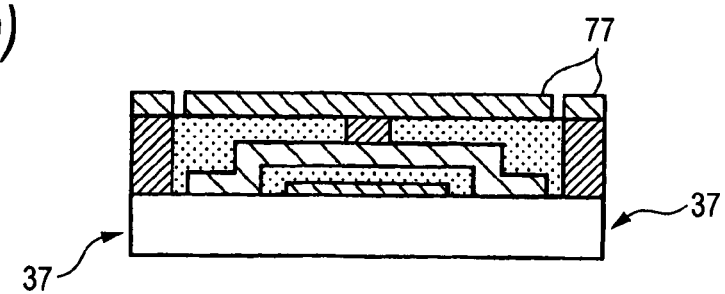
FIG. 8 is a diagram showing steps (h) to (l) of producing the optical control element of the first embodiment.
Figure 8:
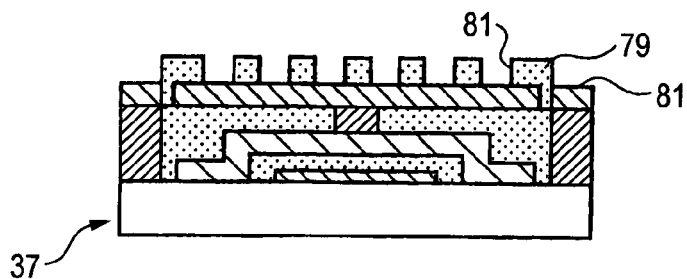
Figure 8:
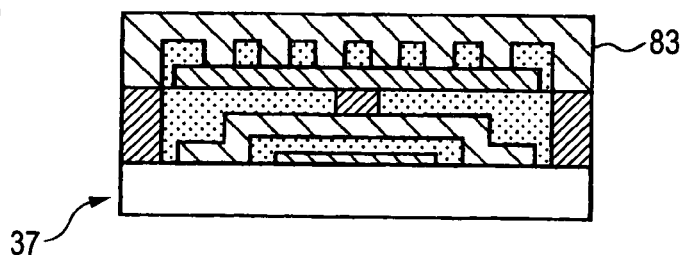
Figure 8:
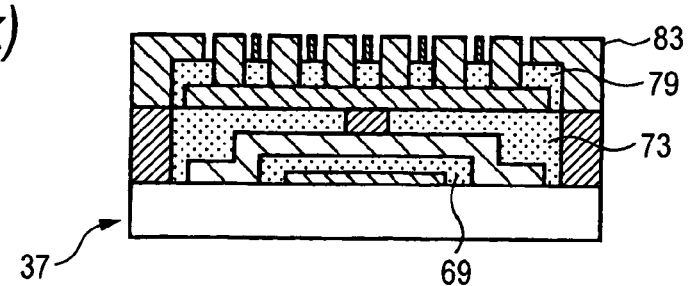
Figure 8:
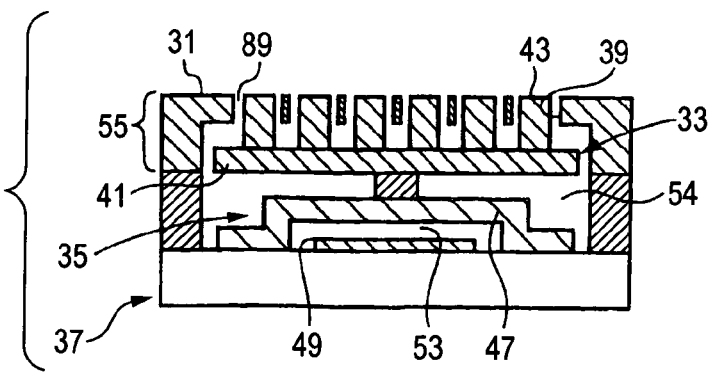

FIG. 6 is a section view of a driving circuit substrate of the optical control element of the first embodiment, FIG. 7 is a diagram showing steps (a) to (g) of producing the optical control element of the first embodiment, and FIG. 8 is a diagram showing steps (h) to (l) of producing the optical control element of the first embodiment.

Any kind of substrate such as an Si substrate or a glass substrate may be used as the substrate 37 shown in FIG. 6 and (a) of FIG. 7. Practically, structural members of the drive portion 35 and the optical function portion 55 are formed on the substrate (driving circuit substrate) 37 on which a driving circuit is formed. In a specific example of the driving circuit substrate, circuits (a CMOS circuit and a wiring circuit for the CMOS circuit) 63 for driving the element are formed on an Si substrate 61, an insulating film 65 of $SiO_2$ or the like is formed on the circuits, the surface of the insulating film is flattened by CMP or the like, and contact holes (not shown) for connecting outputs of the driving circuit 63 to the electrodes of the element are then formed.

Then, as shown in (b) of FIG. 7, a first aluminum thin film (preferably, an aluminum alloy containing a refractory metal) 67 is depositedon the substrate 37 by sputtering, and then patterned into a desired electrode pattern by usual photolithography and etching processes to form the lower electrode 49. At this time, the contact holes are formed in the insulating film 65 (see FIG. 6), and the lower electrode 49 is connected to the output of the driving circuit 63, so that an arbitrary potential can be supplied.

As shown in (c) of FIG. 7, a first positive photoresist 69 is applied, and the applied photoresist is patterned into shapes of beams and then hard-baked. The first positive photoresist 69 functions as a sacrifice layer, and is removed away in the step described below to be formed as the gap 53. Therefore, the film thickness of the hard-baked photoresist after the hard-baking determines the spatial position of the movable film 47 which is formed in future. Usually, the photoresist is controlled so as to have a thickness of 0.1 to 10 µm. Photosensitive polyimide may be used in place of the first positive photoresist 69.

As shown in (d) of FIG. 7, a second aluminum thin film (preferably, an aluminum alloy containing a refractory metal) 71 is deposited by sputtering, and then patterned into a desired pattern by usual photolithography and etching processes to form beams. At this time, the contact holes are formed in the insulating film 65 of the substrate 37, and the beams are connected to the outputs of the driving circuit, so that an arbitrary potential can be supplied.

As shown in (e) of FIG. 7, a second positive photoresist 73 is applied, and the applied photoresist is patterned by photolithography and etching processes so that the regions of the connecting portion 45 between the drive portion 35 and the optical function portion 55, and supporting portions 52 (see FIG. 2) of the stationary surface film 31 both have recesses 75. The patterned photoresist is hard-baked. Because of the surface tension during the process of forming the photoresist, the surface of the photoresist is flattened irrespective of the step difference in the base film. The second positive photoresist 73 functions as a sacrifice layer, and is removed away in the step described below to be formed as a gap. Photosensitive polyimide may be used in place of the second positive photoresist 73.

As shown in (f) of FIG. 7, a TiN thin film functioning as a base film is deposited by sputtering (this is not shown in the figure), and then a tungsten (W) film 76 is then deposited by sputtering. As a result, the W film is embedded into the recesses 75 for the connecting portion 45 between the drive portion 35 and the optical function portion 55, and for the supporting portions 52 of the stationary surface film 31.

As shown in (g) of FIG. 7, the W film 76 and the TiN film which are in the outermost surface are removed away with polishing by CMP (Chemical Mechanical Polishing) until the surface of the second positive photoresist 73 is exposed. As a result, the flatness of the support film (the base portion 41) for the dots 43 is attained.

As shown in (h) of FIG. 8, a third aluminum thin film (preferably, an aluminum alloy containing a refractory metal) 77 is deposited by sputtering, and then patterned into a desired pattern by usual photolithography and etching processes to form the dot support film (the base portion 41) and a part of the supporting portions 52 of the stationary surface film 31.

As shown in (i) of FIG. 8, a third positive photoresist 79 is applied, and the applied photoresist is patterned by photolithography and etching processes so that the regions of the dots 43 and the supporting portions 52 of the stationary surface film 31 both have recesses 81. The patterned photoresist is hard-baked. Because of the surface tension during the process of forming the photoresist, the surface of the photoresist is flattened irrespective of the step difference in the base film. The third positive photoresist 79 functions as a sacrifice layer, and is removed away in the step described below to be formed as a gap. Photosensitive polyimide may be used in place of the third positive photoresist 79.

As shown in (j) of FIG. 8, a fourth aluminum thin film (preferably, an aluminum alloy containing a refractory metal) 83 is deposited by sputtering.

As shown in (k) of FIG. 8, the fourth aluminum thin film 83 is patterned into a desired pattern by usual photolithography and etching processes to form the dots 43 and the stationary surface film 31. In this process, gaps of the dots 43 and the stationary surface film 31 are etched away, and high-resolution photolithography and etching processes of, for example, 0.1 to 0.2 nm are required. In the photolithography step, EB exposure, ArF excimer laser exposure, stepper exposure using i-beams, or the like is preferably used, and, in the etching step, dry etching using RIE is preferably used.

As shown in (l) of FIG. 8, finally, the first, second, and third positive photoresists 69, 73, and 79 functioning as sacrifice layers are removed away by plasma etching in oxygen gas, thereby forming the gaps 53, 54. In this process, openings which are not shown may be opened so that the underground phtoresist layer(s) (the third positive photoresist 79 and the like) are exposed from the thin film layer (stationary surface film) 31 other than the regions of the dots 43. When the openings for exposing the positive photoresist layers are formed in the thin film layer (stationary surface film) 31 in this way, the exposed portions of the positive photoresist layers which are originally restricted to the removed portions (cylindrical gaps 89) of the thin film layers that are removed to a depth at which they reach the positive photoresist layers and along the outer peripheries of the dot holes can be increased by the openings. As a result, the positive photoresists 69, 73, and 79 can be rapidly etched.

When the sacrifice layers are removed away as described above, the dot array 33 can be vertically moved in parallel to the stationary surface film 31. In the initial state, the upper faces of the dots 43 are equal in level to the surface of the stationary surface film 31, and light which is incident from the upper side can be regularly reflected. When a potential difference is produced between the lower electrode 49 and the movable film 47 by the driving circuit, the movable film 47 is downward flexed by an electrostatic force, and at the same time the base portion 41 and the dots 43 are downward displaced. As a result, a structure is obtained where light incident from the upper side is scattered or diffracted by dot-like recesses (namely, the through holes 39) so that the incident light can be modulated.

In the optical control element 100, the minute optical function portion 55 in which the stationary surface film 31 and the dots 43 are relatively displaceable is formed, and hence displacements of two-dimensionally arranged microdots or nanodots can be controlled. According to the configuration, it is possible to exert various optical functions which are hardly exerted by a related structure where several beams are displaced in each pixel.

Moreover, the optical function portion 55 configured by the stationary surface film 31 and the dot array 33, and the drive portion 35 are functionally separated from each other. Therefore, restrictions between the portions are eliminated, so that the quality (such as the accuracy of the dot shape) of the optical function portion 55, and the properties of the drive portion 35, and the like can be independently designed. Furthermore, the structure where the drive portion 35 is placed under the optical function portion 55 can be employed. Therefore, the drive portion 35 can be hidden under the dot array 33, so that the effective area of the optical function portion 55 is widened. In the structure where the drive portion 35 is placed under the optical function portion 55, the dots 43 can be vertically displaced with respect to the stationary surface film 31, and hence the gaps between the through holes 39 and the dots 43 can be set small. Since the dot array 33 driven by the drive portion 35 is formed as an integral structure in which the dots 43 are protruded, level uniformity among the dots can be easily ensured (the flatness of the optical function portion can be easily enhanced).

In the above, the optical control element 100 has been described as an element which constitute a pixel as a unit. When a plurality of such elements are arranged one- or two-dimensionally, it is possible to configure an optical control element array. In the optical control element array, plural dots 43 are displaced in each pixel, and the resolution of an image to be formed can be enhanced as compared with that in the related structure where one or several beams are displaced in each pixel. Moreover, various optical functions which are hardly realized in the related structure can be exerted. A high-speed exposure head element, and a high-resolution projector element in which such optical functions are used can be produced.

In the process for producing an optical control element includes the steps of: forming the third positive photoresist (positive photoresist layer) 79 on the upper face of the base portion 41 in which the lower face is coupled to the drive portion 35, and forming a plurality of the recesses 81 (dot holes) through which the upper face of the base portion 41 is exposed, in the third positive photoresist 79; depositing the fourth aluminum thin film 83 (thin film layer) on the third positive-photoresist 79; and removing the fourth aluminum thin film 83 along the outer peripheries of the recesses 81, to a depth at which the removed portions reach the third positive photoresist 79, and removing the third positive photoresist 79, thereby forming the dots 43 which are separated from the fourth aluminum thin film 83, on the upper face the base portion 41.

Therefore, the fourth aluminum thin film 83 which enters the recesses 81 to cover the third positive photoresist 79 is separated into the dots 43 that are bonded to the upper face of the base portion 41 and upstand therefrom, and the stationary surface film (thin film) 31 in which the dots 43 are loosely fitted into the through holes 39. As a result, the minute optical function portion 55 configured by the stationary surface film 31 in which the plural through holes 39 are opened, and the dots 43 that are loosely fitted into the through holes 39 of the stationary surface film 31, respectively can be formed without causing the shape and properties of the dots to be dispersed, and with attaining high reliability and quality.

In the optical control element 100, preferably, a multilayer mirror is formed at least on the surface of the stationary surface film 31 and the upper faces of the dots 43. According to the configuration, the reflectivity is made higher than that in the case of a metal reflective film, and the stationary surface film 31 and the dots 43 absorb a less amount of light, so that heat generation due to light absorption is reduced. As a result, the power resistance property of the optical function portion 55 against a high-power laser can be enhanced.

The optical control element 100 of the first embodiment can be modified in structure, used materials, and production process in the following manners.

In the lower electrode 49 and the movable film 47, crystalline Si, polycrystalline Si, metals (Cr, Mo, Ta, Ni, and the like), metal silicides, and conductive organic materials can be preferably used as conductive materials in place of the above-mentioned materials.

A protective insulating film (for example, $SiO_2$ or $SiN_x$) may be stacked on the conductive materials. As the movable film 47, a hybrid structure may be used in which a conductive thin film of a metal or the like is stacked on an insulative thin film of $SiO_2$, $SiN_x$, BSG, a metal oxide film, a polymer, or the like.

The connecting portion 45 between the drive portion 35 and the optical function portion 55, the supporting portions 52 of the stationary surface film 31, the dot supporting portion, the dots 43, and the stationary surface film 31 may be made of any kind of material as far as it does not depart the spirit and scope of the invention. For example, the materials of these components may be electrically insulative or conductive. Either of inorganic and organic materials may be used.

An adequate optical functional material may be disposed at least on the upper faces of the dots 43 and the stationary surface film 31. For example, a metal mirror, or a multilayer mirror may be disposed in the surface layer.

In the embodiment, a photoresist material is used as the sacrifice layers. The materials of the sacrifice layers are not restricted to this. For example, a metal such as aluminum or Cu, a semiconductor material such as poly-Si, or an insulating material such as $SiO_2$ can be preferably used as the sacrifice layers. In this case, a material which is not corroded nor damaged during the processes of removing the sacrifice layers is adequately selected as a structural material.

As the process for removing the sacrifice layers, in place of the above-mentioned dry etching (plasma etching), wet etching may be employed depending on a known combination of a structural material and a sacrifice layer. In the case of wet etching, a drying method based on the supercritical drying method or the freeze-drying method is preferably employed because the structural material does not cause sticking due to the surface tension in rinsing and drying steps after the etching step. When required, an F-based surface treatment may be conducted in order to prevent sticking from occurring after the element is produced.

The structures of the drive portion 35 and the optical function portion 55 are not restricted to those described above, and may have any structure as far as it has a function of vertically displacing the dots 43 with respect to the stationary surface film 31. In the embodiment, an electrostatic actuator composed of a pair of parallel plates is used. Alternatively, plural parallel plate type electrostatic actuators may be used with being coupled to one another, or a push-pull configuration in which active displacement can be conducted in both vertical directions may be employed. The actuator is not restricted to the parallel plate type, and may be any kind of actuator such as a Comb-Drive type (comb-type) electrostatic actuator, a piezoelectric actuator, or an electromagnetic actuator.

Next, a second embodiment of the optical control element of the invention will be described.

FIG. 9 is a section view of the second embodiment in which dots are protruded from a thin film in the initial state. The components identical with those shown in FIGS. 1 to 4 are denoted by the same reference numerals, and their duplicated description is omitted.

In the optical control element 200 of the embodiment, the dots 91 are set to have a height which is larger than that in the optical control element 100 of the first embodiment. When the drive portion 35 does not conduct the driving operation as shown in FIG. 9A, therefore, the upper faces of the dots 91 are placed higher in level than the surface of the stationary surface film 31, and, when the drive portion 35 conducts the driving operation as shown in FIG. 9B, the surface of the stationary surface film 31 and the upper faces of the dots 91 are placed in the same plane.

In the optical control element 200, in the normal state, the upper faces of the dots 91 are placed higher in level than the surface of the stationary surface film 31. When the level difference is equal to ¼ of the wavelength λ of incident light, the light is diffracted. By contrast, when the drive portion 35 conducts the driving operation, the dots 91 are lowered, and the dots 91 are retracted into the through holes 39, so that the surface of the stationary surface film 31 and the upper faces of the dots 91 are placed in the same plane. As a result, an optical function portion 93 operates as a total reflection mirror, and incident light is regularly reflected. Namely, an element which conducts diffraction in the normal state, and which, when a voltage is applied, conducts regular reflection is obtained.

Next, a third embodiment of the optical control element of the invention will be described.

Figure 12:
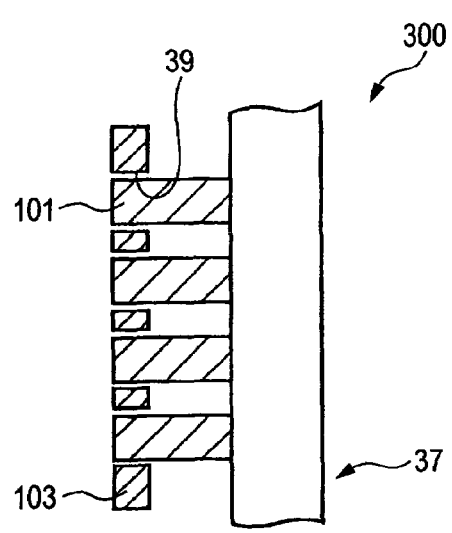
FIG. 12 is a section view taken along the line D—D in FIG. 10.
Figure 13:
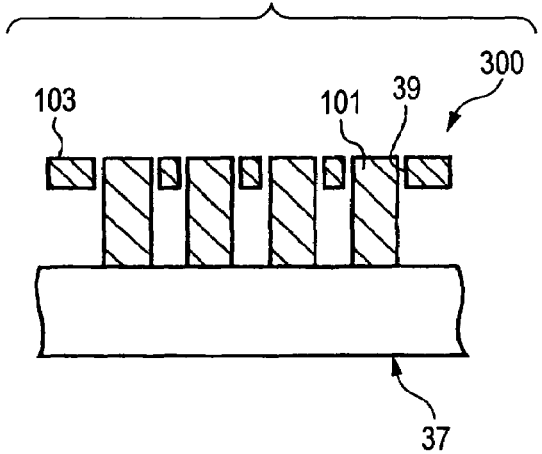
FIG. 13A is a diagram illustrating the operation of the optical control element shown in FIG. 10 in an initial state.
FIG. 13B is a diagram illustrating the operation of the optical control element in a driven state.
Figure 13:
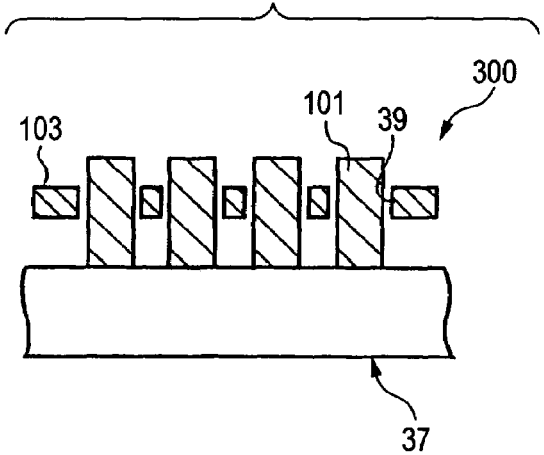

FIG. 10 is a plan view of the third embodiment in which a thin film is movable and dots are stationary, FIG. 11 is a section view taken along the line C—C in FIG. 10, FIG. 12 is a section view taken along the line D—D in FIG. 10, FIG. 13A is a diagram illustrating the operation of the optical control element shown in FIG. 10 in an initial state, and FIG. 13B is a diagram illustrating the operation of the optical control element in a driven state. The components identical with those shown in FIGS. 1 to 4 are denoted by the same reference numerals, and their duplicated description is omitted.

In the optical control element 300 of the embodiment, as shown in FIG. 12, dots 101 are directly fixed to the substrate 37. Therefore, the dots 101 are immovable. By contrast, unlike the stationary surface film 31 described above, the thin film is formed as a movable surface film 103. As shown in FIG. 11, the movable surface film 103 is fixed to the movable film 47 of the drive portion 35 via the connecting portion 45. In the optical control element 300 of the embodiment, namely, the dots 101 are fixed, and the movable surface film 103 which is a thin film is movable, so that the dots 101 and the thin film are relatively displaceable. In this embodiment, the movable surface film 103 are connected to the drive portion 35 through a connecting portion 45. Alternatively, the drive portion 35 and the movable surface film 103 may be connected directly.

The optical control element 300 may have a structure where plural dots 101 are fixed in bundle to the substrate 37 via a supporting portion which is not shown. According to this structure, it is possible to ensure a large accommodation space for the drive portion 35. In the embodiment, the dots 101 are fixed, and the thin film is movable. Alternatively, also the dots 101 may be movable In the optical control element 300, in the normal state (the state where the drive portion 35 does not conduct the driving operation), the movable surface film 103 is placed in the position which is separated from the substrate 37, with the result that, as shown in FIG. 13A, the surface of the movable surface film 103 disposed in the upper side is placed in the same plane as the upper faces of the dots 101. When the movable surface film 103 is irradiated with light in this state, the incident light is regularly reflected by the surface of the movable surface film 103 and the upper faces of the dots 101 which are in the same plane to constitute a reflective face.

By contrast, when the drive portion 35 conducts the driving operation, the movable surface film 103 is elastically deformed to be moved, and, as shown in FIG. 13B, the dots 101 are protruded from the through holes 39, so that the upper faces of the dots 101 are placed higher in level than the movable surface film 103. When the movable surface film 103 is irradiated with light in this state, the reflected light is diffused or diffracted.

In the optical control element 300, when the movable film 47 of the drive portion 35 is moved, therefore, the movable surface film 103 which is a thin film is moved following the movement, with the result that the surface of the movable surface film 103 is relatively moved with respect to the upper faces of the dots 101. In this case, the mass of the thin film functioning as the movable surface film 103 is smaller than that of the dot array 33 in which the large number of dots 101 are disposed. Therefore, this configuration is advantageous to speed enhancement. Moreover, it is not required to form the dot array 33 and the drive portion 35 with using a joining structure. Therefore, the structure of the element is simplified, and the element can be easily produced.

Next, a fourth embodiment of the optical control element of the invention will be described.

Figure 14:
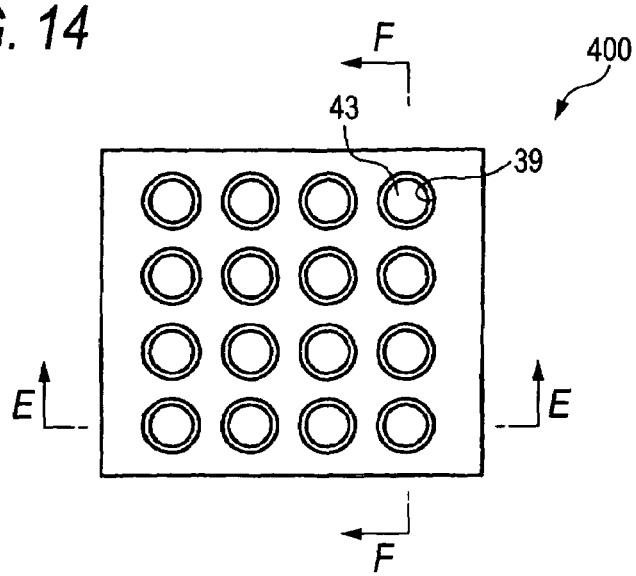
FIG. 14 is a plan view of a fourth embodiment in which plural dots are divided into groups of an arbitrary number of dots.
Figure 15:
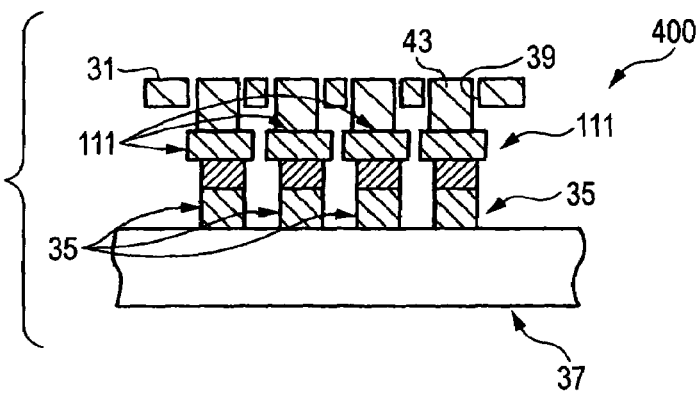
FIG. 15 is a section view taken along the line E—E in FIG. 14.
Figure 16:
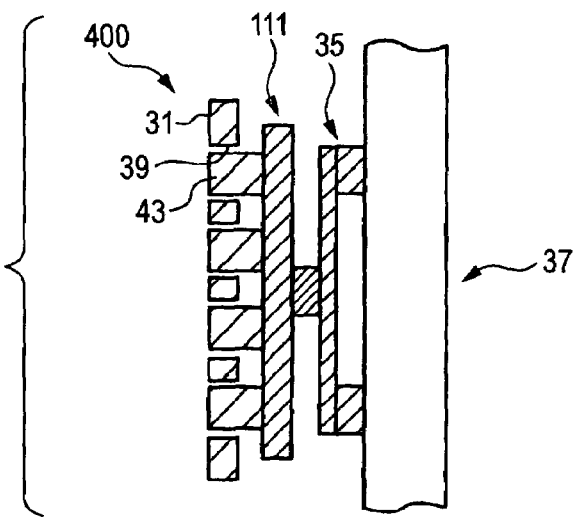
FIG. 16 is a section view taken along the line F—F in FIG. 14.

FIG. 14 is a plan view of the fourth embodiment in which plural dots are divided into groups of an arbitrary number of dots, FIG. 15 is a section view taken along the line E—E in FIG. 14, and FIG. 16 is a section view taken along the line F—F in FIG. 14. The components identical with those shown in FIGS. 1 to 4 are denoted by the same reference numerals, and their duplicated description is omitted.

In the optical control element 400 of the embodiment, a dot array 111 is divided into arrays of an arbitrary number of dots 43, and each of the divided dot arrays 111 is driven by the drive portion 35. In the illustrated example, four dots 43 are driven in one column, so that four columns of dot arrays 111 can be independently driven.

In the optical control element 400, the dots which are two-dimensionally arranged may be divided in the unit of row or arbitrary combination of blocks. The drive portion 35 may be disposed in an arbitrary number. In the case where plural drive portions 35 are disposed, the divided dot groups (dot arrays 111) may be simultaneously driven, or independently driven.

As described above, in the optical control element 400, a pixel is configured by plural dots 43, and the plural dots are divided into groups of an arbitrary number of dots 43. When the divided dot groups are set, for example, so as to correspond respectively to RGB sub-pixels which are minimum pixels, therefore, colorization is enabled in the unit of pixel.

Next, modifications which are applicable to the embodiments described above will be described. Although, in the following, the case of the dots 43 will be described, the modifications can be similarly applied to the cases of the dots 91 and 101.

Figure 17:
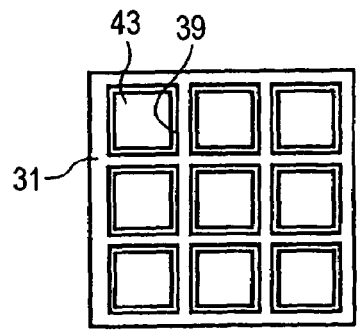
FIGS. 17A and 17B are plan views of Modification 1 in which optical control elements have different dot shapes and manners of arrangement.
Figure 17:
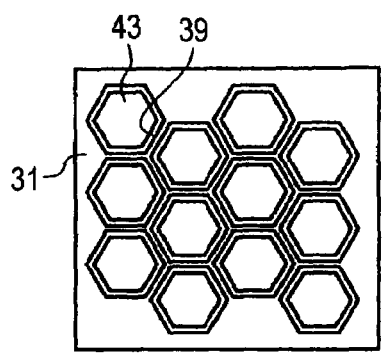

FIGS. 17A and 17B are plan views of Modification 1 in which optical control elements have different dot shapes and manners of arrangement.

As shown in FIG. 17A, the dots 43 may have a rectangular shape, or, as shown in FIG. 17B, may have a polygonal shape such as a hexagonal shape. As shown in FIG. 17A, the dots 43 may be arranged on perpendicular lines, or, as shown in FIG. 17B, may be arranged in a staggered pattern. When the dots 43 have a hexagonal shape and are arranged in a staggered pattern as described above, the distance between the dots can be shortened, and hence the arrangement density is made higher.

Figure 18:
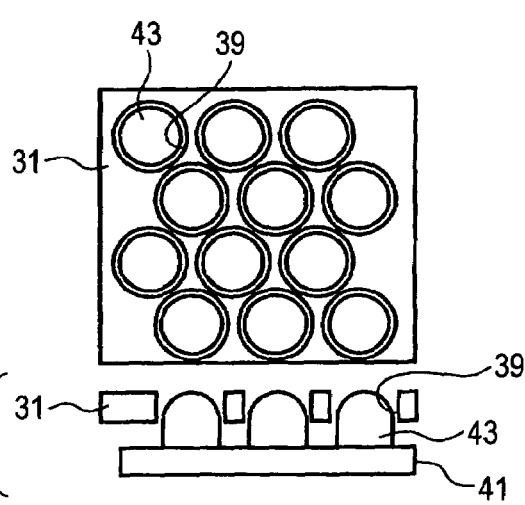
FIG. 18A is a diagram showing in a plan view of Modification 2 in which the optical control element has a different dot shape.
FIG. 18B is a diagram showing in a section of the modification.
Figure 18:
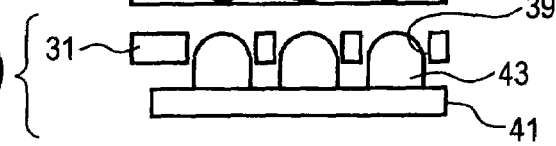

FIG. 18A is a diagram showing in a plan view of Modification 2 in which the optical control element has a different dot shape, and FIG. 18B is a diagram showing in a section of the modification.

The dots 43 may have a shape in which, for example, the upper portion is formed into a hemispherical shape. When the dots have such a shape, the dots 43 can be prevented from hitching on the stationary surface film 31 during relative displacement, so that smooth relative movement can be realized. Alternatively, the dots 43 may have a conical shape or a pyramidal shape.

Figure 19:
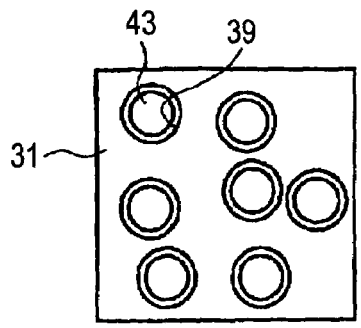
FIG. 19 is a plan view of Modification 3 in which dots are randomly arranged.

FIG. 19 is a plan view of Modification 3 in which dots are randomly arranged.

The dots 43 may be arranged in a random pattern. When the dots 43 are distributedly arranged in an irregular pattern, it is possible to attain effects such as that Moire fringes can be reduced.

Figure 20:
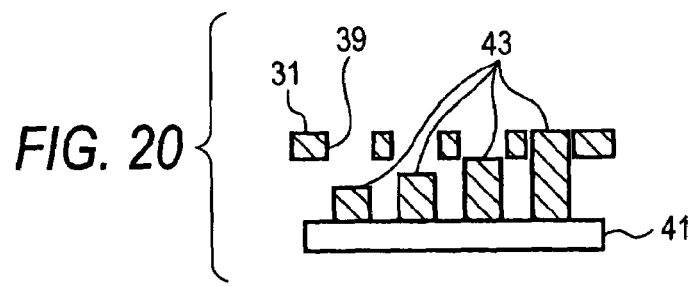
FIG. 20 is a section view of Modification 4 in which dots are formed in different heights.

FIG. 20 is a section view of Modification 4 in which dots are formed in different heights.

A height difference may be produced between adjacent dots 43, so that the dots 43 are formed into, for example, a step-like manner. According to the configuration, the reflection amount in a pixel is stepwise changed, thereby enabling, for example, gray-scale control to be conducted.

When the surface of the thin film constitutes a reflective face, the surfaces of the dots 43 may be configured in the following manner.

In each of the dots 43, for example, only the upper face is formed as a reflective face. In this structure, a reflective film can be disposed only on the uppermost layer of the dot 43, and hence the reflective film can be easily formed. In this case, any bulk material may be used in the dots 43.

In each of the dots 43, alternatively, the bulk (or the side face) and the upper face may be formed as a reflective face. In this structure, when the dot 43 is controlled so as to be protruded, also light incident on the side face can be effectively used, so that the reflection efficiency can be enhanced.

Figure 21:
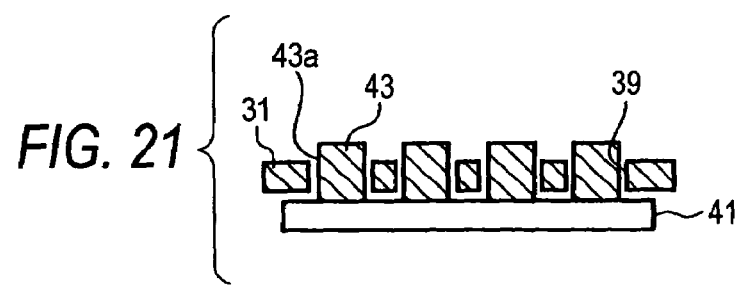
FIG. 21 is a section view of Modification 5 in which a light absorbing layer is formed on the side face of each dot.
Figure 22:
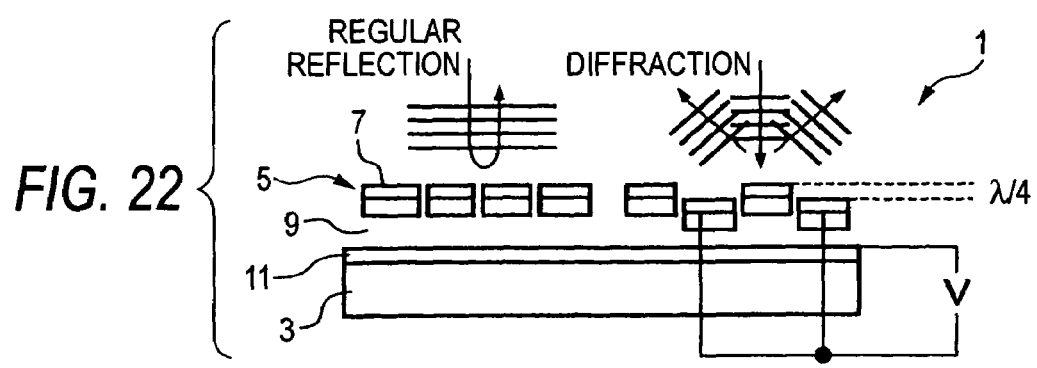
FIG. 22 is a diagram illustrating the principle of a GLV which is an optical control element.

FIG. 21 is a section view of Modification 5 in which a light absorbing layer is formed on the side face of each of the dots.

Only the surface of the stationary surface film 31 may be formed as a reflective face, and the bulk (or the side face 43*a*) of each of the dots 43 may be formed as a light absorbing layer. In this structure, when the surface of the stationary surface film 31 and the upper faces of the dots 43 are placed in the same plane, light incident on the optical function portion is regularly reflected, and, in the state where the dots 43 are protruded from the surface of the stationary surface film 31, the side faces of the dots 43 on which the light absorbing layer is formed are exposed. When an optical path is designed so that light is incident on these portions, therefore, it is possible to control regular reflection and absorption of light.

In the optical control elements of the embodiments, an arbitrary driving method may be employed. For example, either of a digital (binary) method and an analog (continuous displacement control) method may be employed. A stable displacement position of the movable portion (the movable film 47 or the movable surface film 103) may be one (monostable) or plural (bistable or multistable).

The present invention is not limited to the specific above-described embodiments. It is contemplated that numerous modifications may be made to the present invention without departing from the spirit and scope of the invention as defined in the following claims.

What is claimed is:

1. An optical control element for controlling an optical phenomenon by relatively changing levels of dots with respect to a film surface that is irradiated with light, wherein the optical control element comprises:
   a thin film having a plurality of through holes;
   a dot array in which a plurality of dots are protruded, the dots being loosely fitted into the through holes of the thin film, respectively; and
   a drive portion which relatively displaces at least one of the thin film and the dot array,
   wherein when the film surface and upper faces of the plurality of dots are placed on a same plane, regular reflection of incident light from the film surface and upper faces of the plurality of dots is obtained, and an optical reflection property changes when a level difference exists between the film surface and the upper faces of the plurality of dots.

2. The optical control element according to claim 1, wherein the drive portion has a movable film, and the dot array is fixed to the movable film.

3. The optical control element according to claim 2, wherein the dot array is fixed to the movable film through a connecting portion.

4. The optical control element according to claim 1, wherein each of the dots has a size of $\lambda/10$ to $10\lambda$ where $\lambda$ is a wavelength of the light.

5. The optical control element according to claim 1, wherein the drive portion is an electrostatic microactuator which uses an electrostatic force as a driving force.

6. The optical control element according to claim 1, wherein
   when the drive portion does not conduct a driving operation, a surface of the thin film and upper faces of the dots are placed in a same plane; and
   when the drive portion conducts the driving operation, the upper faces of the dots are placed lower in level than the surface of the thin film.

7. The optical control element according to claim 1, wherein
   when the drive portion does not conduct a driving operation, upper faces of the dots are placed higher in level than a surface of the thin film; and
   when the drive portion conducts the driving operation, the surface of the thin film and the upper faces of the dots are placed in a same plane.

8. The optical control element according to claim 1, wherein the drive portion has a movable film, and the thin film is fixed to the movable film.

9. The optical control element according to claim 8, wherein the thin film is fixed to the movable film through a connecting portion.

10. The optical control element according to claim 1, wherein the dot array is divided into arrays of an arbitrary number of dots to form divided dot arrays, and each of the divided dot arrays has the drive portion.

11. The optical control element according to claim 1, wherein the through holes and the dots are arranged in a staggered pattern.

12. The optical control element according to claim 1, wherein each of the dots has a light absorbing layer made of an absorbing material for the light on a side face of each of the dots.

13. An optical control element array using optical control elements for controlling an optical phenomenon by relatively changing levels of dots with respect to a film surface that is irradiated with light,
   wherein each optical control element comprises:
   a thin film said thin film having a reflective surface, having a plurality of through holes;
   a dot array in which a plurality of dots are protruded, the dots being loosely fitted into the through holes of the thin film, respectively; and
   a drive portion which relatively displaces at least one of the thin film and the dot array, wherein each of the optical control elements constitutes a pixel, and the optical control elements are arranged in one or two dimension.

14. An optical control element for controlling an optical phenomenon by relatively changing levels of dots with respect to a film surface that is irradiated with light,
wherein the optical control element comprises:
a thin film having a plurality of through holes;
a dot array in which a plurality of dots are protruded, the dots being loosely fitted into the through holes of the thin film, respectively; and
a drive portion which relatively displaces at least one of the thin film and the dot array, wherein a multilayer mirror is formed at least on a surface of the thin film and upper faces of the dots.

15. An optical control element for controlling an optical phenomenon by relatively changing levels of dots with respect to a film surface that is irradiated with light,
wherein the optical control element comprises:
a thin film said thin film having a reflective surface, having a plurality of through holes;
a dot array in which a plurality of dots are protruded, the dots being loosely fitted into the through holes of the thin film, respectively; and
a drive portion which relatively displaces at least one of the thin film and the dot array,
wherein the dot array is divided into a plurality of arrays of an arbitrary number of dots to form divided dot arrays, and each of the divided dot arrays has a separate drive portion.

* * * * *